United States Patent
Smith et al.

(10) Patent No.: US 6,460,644 B1
(45) Date of Patent: Oct. 8, 2002

(54) TWO POSITION TILT HOOD

(75) Inventors: Richard Jon Smith, Dubuque; Rex Allen Hanson, Peosta, both of IA (US); Peter John Mayer, Cuba City, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/645,396

(22) Filed: Aug. 24, 2000

(51) Int. Cl.[7] .............................................. B62D 25/08
(52) U.S. Cl. ................................................... 180/89.17
(58) Field of Search .............................. 180/900, 89.1, 180/89.12, 89.13, 89.17, 69.21; 16/368, 369, 357, 361

(56) References Cited

U.S. PATENT DOCUMENTS

| | | | |
|---|---|---|---|
| 3,622,174 A | * 11/1971 | Wakeen et al. ............. 280/760 |
| 3,949,889 A | * 4/1976 | Moe ........................... 172/272 |
| 4,359,119 A | * 11/1982 | Kammerman ............ 180/69.21 |
| 4,382,312 A | * 5/1983 | Liggett et al. ................ 16/365 |
| 4,991,675 A | * 2/1991 | Tosconi et al. ........... 180/69.21 |
| 5,101,921 A | * 4/1992 | West et al. ............... 180/69.21 |
| 5,339,494 A | 8/1994 | Esau et al. .................... 16/294 |
| 5,435,406 A | * 7/1995 | Gaffoglio et al. ........ 180/69.21 |
| 5,535,846 A | 7/1996 | Kurtz et al. .............. 180/69.21 |
| 5,564,514 A | 10/1996 | Knight ...................... 180/69.2 |
| 5,634,525 A | 6/1997 | Templeton et al. ...... 180/69.24 |
| 5,803,198 A | 9/1998 | Baxter et al. ............ 180/69.21 |
| 6,213,235 B1 | * 4/2001 | Elhardt et al. ............. 180/69.2 |

* cited by examiner

*Primary Examiner*—Paul N. Dickson
*Assistant Examiner*—Mariano Sy

(57) ABSTRACT

The front of a hood for a work vehicle is pivotally mounted to the front of the supporting structure. The rear of the hood is located adjacent to a mast. The mast extends vertically upward from the supporting structure of the work vehicle. A work implement having lift arms is operatively coupled to the mast and extends forwardly therefrom about the hood. The work implement has a raised position and a lowered position. The hood has a closed position enclosing the internal combustion engine, an intermediate open position making a portion of the internal combustion engine accessible and a fully opened position wherein the internal combustion engine is more fully accessible. The hood can be opened into its intermediate opened position when the work implement is in its lowered position. The hood can be moved to its fully opened position when the work implement is in its raised position. Those parts of the engine that are more regularly serviced are located so that they can be accessed when the hood is in its intermediate opened position. If more complicated servicing must take place the work implement is lifted to its raised position and the hood moved to its fully opened position.

15 Claims, 6 Drawing Sheets

TWO POSITION TILT HOOD

BACKGROUND OF THE INVENTION

1. Field of the Invention

The present invention is directed to a two position tilt hood for an off road vehicle having a mast with forwardly extending lift arm.

2. Description of the Prior Art

Backhoe loaders are common off road work vehicles. These vehicles are provided with a front mounted loader and a rear mounted backhoe. The lift arms of the loader are pivotally mounted to a mast extending upwardly from the supporting structure of the vehicle. A hood covering an internal combustion engine is located in front of the mast. The hood is made of sheet metal or plastic. To service the engine the hood is opened. Pivotal hoods are not common on these vehicles as the lift arms and the cross bar extending between the lift arms interferes with lifting the hood.

SUMMARY

The front of a hood for a work vehicle is pivotally mounted to the front of the supporting structure. The rear of the hood is located adjacent to a mast. The mast extends vertically upward form the supporting structure of the work vehicle. A work implement having lift arms is operatively coupled to the mast and extends forwardly therefrom about the hood. The work implement has a raised position and a lowered position. The hood has a closed position enclosing the internal combustion engine, an intermediate open position making a portion of the internal combustion engine accessible and a fully opened position wherein the internal combustion engine is more fully accessible. The hood can be opened into its intermediate opened position when the work implement is in its lowered position. The hood can be moved to its fully opened position when the work implement is in its raised position. Those parts of the engine that are more regularly serviced are located so that they can be accessed when the hood is in its intermediate opened position. If more complicated servicing must take place the work implement is lifted to its raised position and the hood moved to its fully opened position.

The hood is provided with side walls that are mounted to a pivot bracket. The pivot bracket is pivotally mounted to the front of the supporting structure. The front of the supporting structure is also provided with an upward extending radiator grill. One of the pivot brackets is provided with a prop rod extending rearwardly therefrom. The end of the prop rod opposite the pivot bracket engages a track formed on the supporting structure. The track comprises a slot having a first defined position corresponding to the intermediate opened position of the hood, and a second defined position corresponding to the fully opened position of the hood. The first and second defined positions comprise enlarged bores in the slot. The end of the prop rod that engages the slot is provided with a spring biased shouldered pin. The small diameter portion of the shouldered pin rides in the slot whereas the large diameter portion of the shouldered pin automatically engages the enlarged bore as the pin slides along the slot.

DETAILED DESCRIPTION

Figure 1:
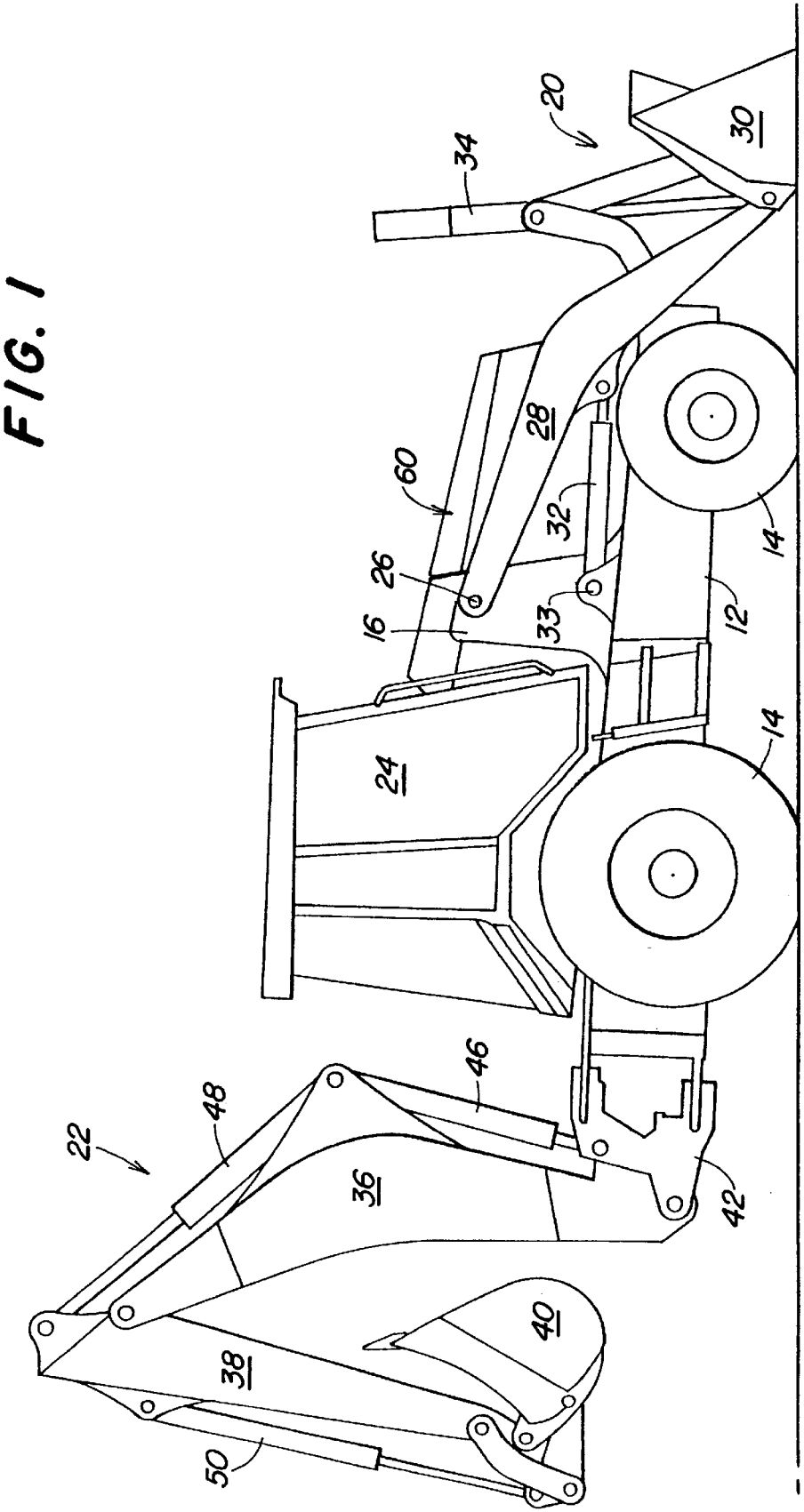
FIG. 1 is a side view of an off road work vehicle wherein the hood is in its closed position.
Figure 2:
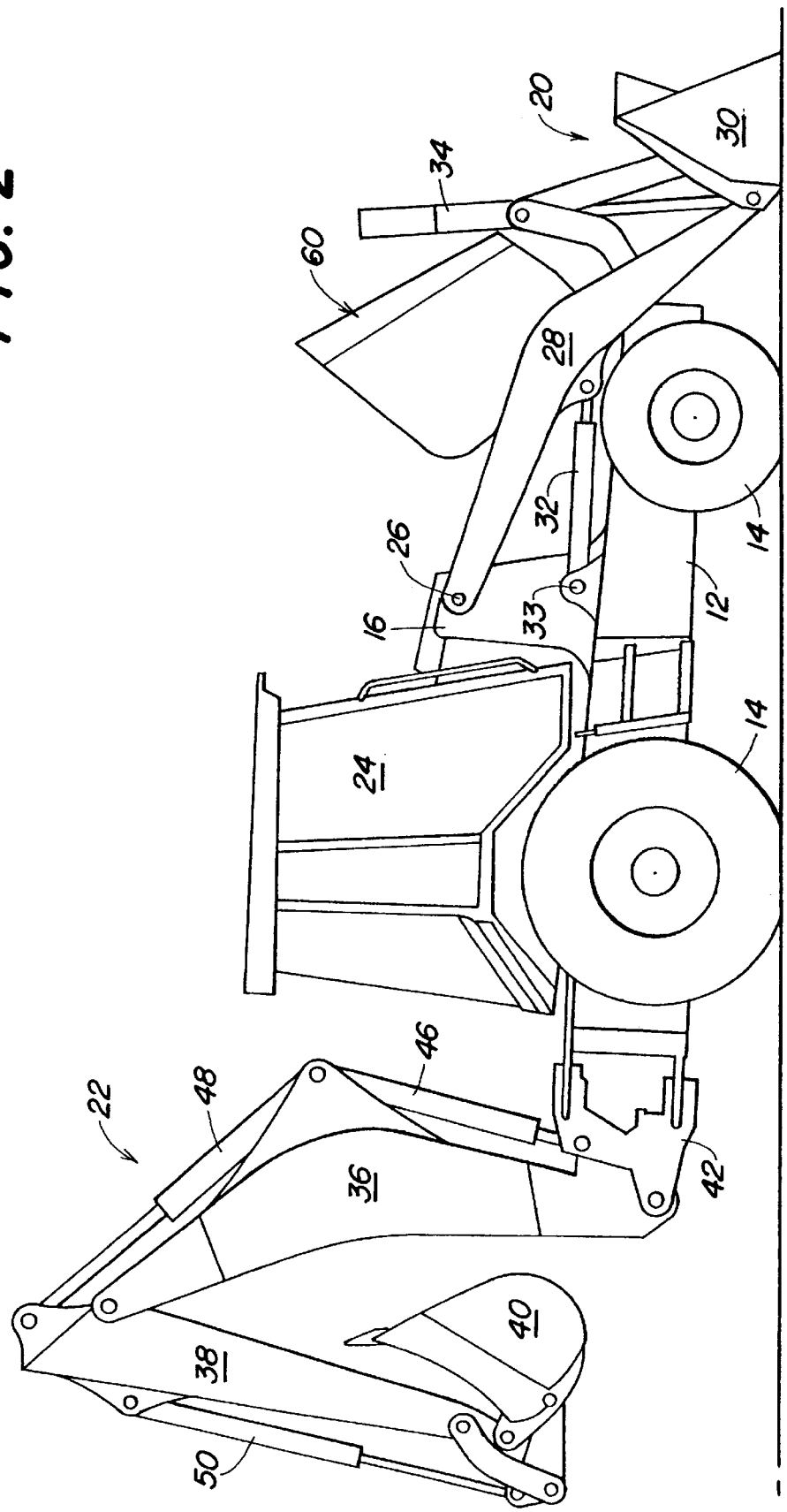
FIG. 2 is a side view of an off road work vehicle wherein the hood is in its intermediate opened position.
Figure 3:
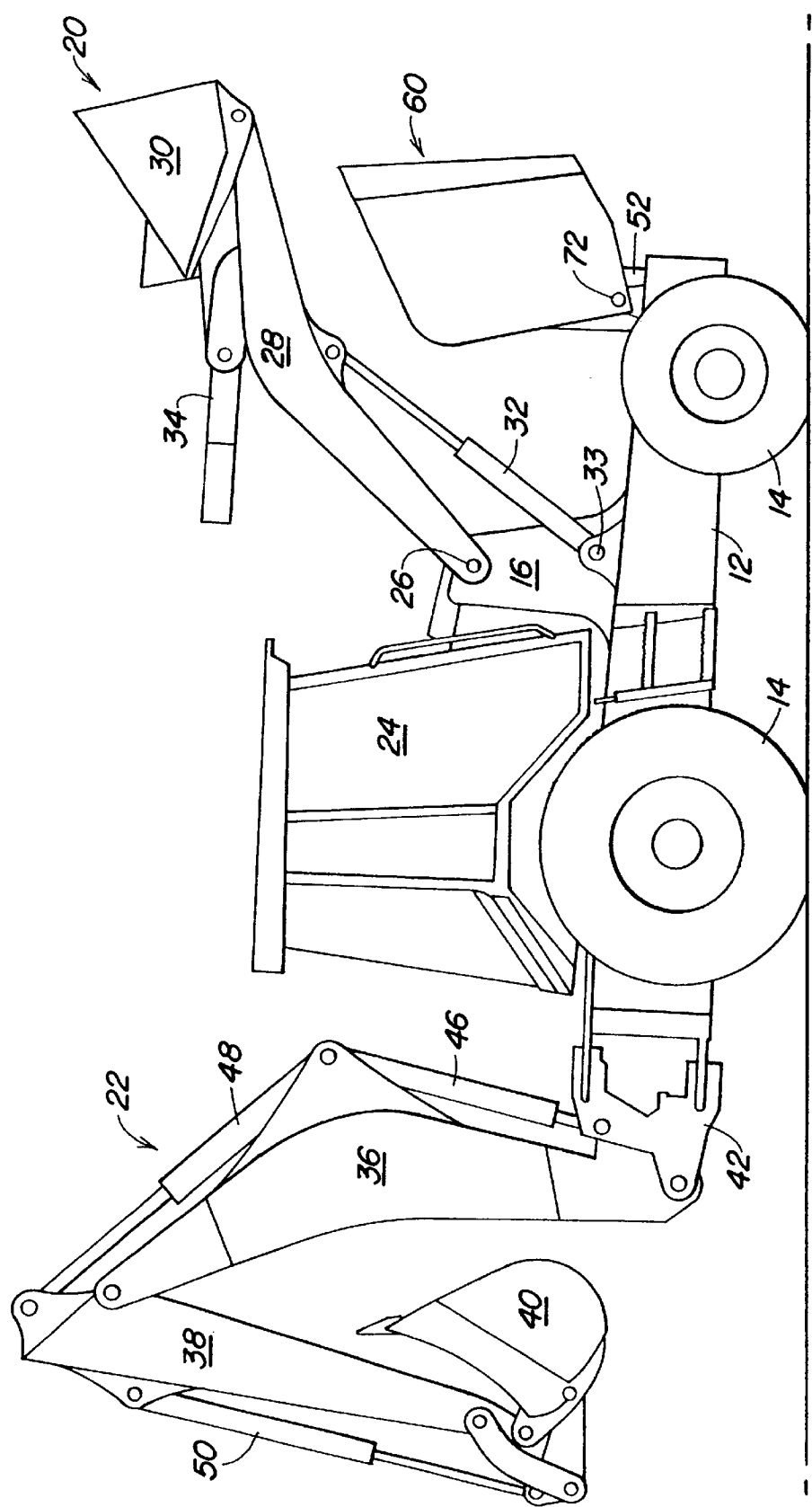
FIG. 3 is a side view of an off road work vehicle wherein the hood is in its fully opened position.
Figure 4:
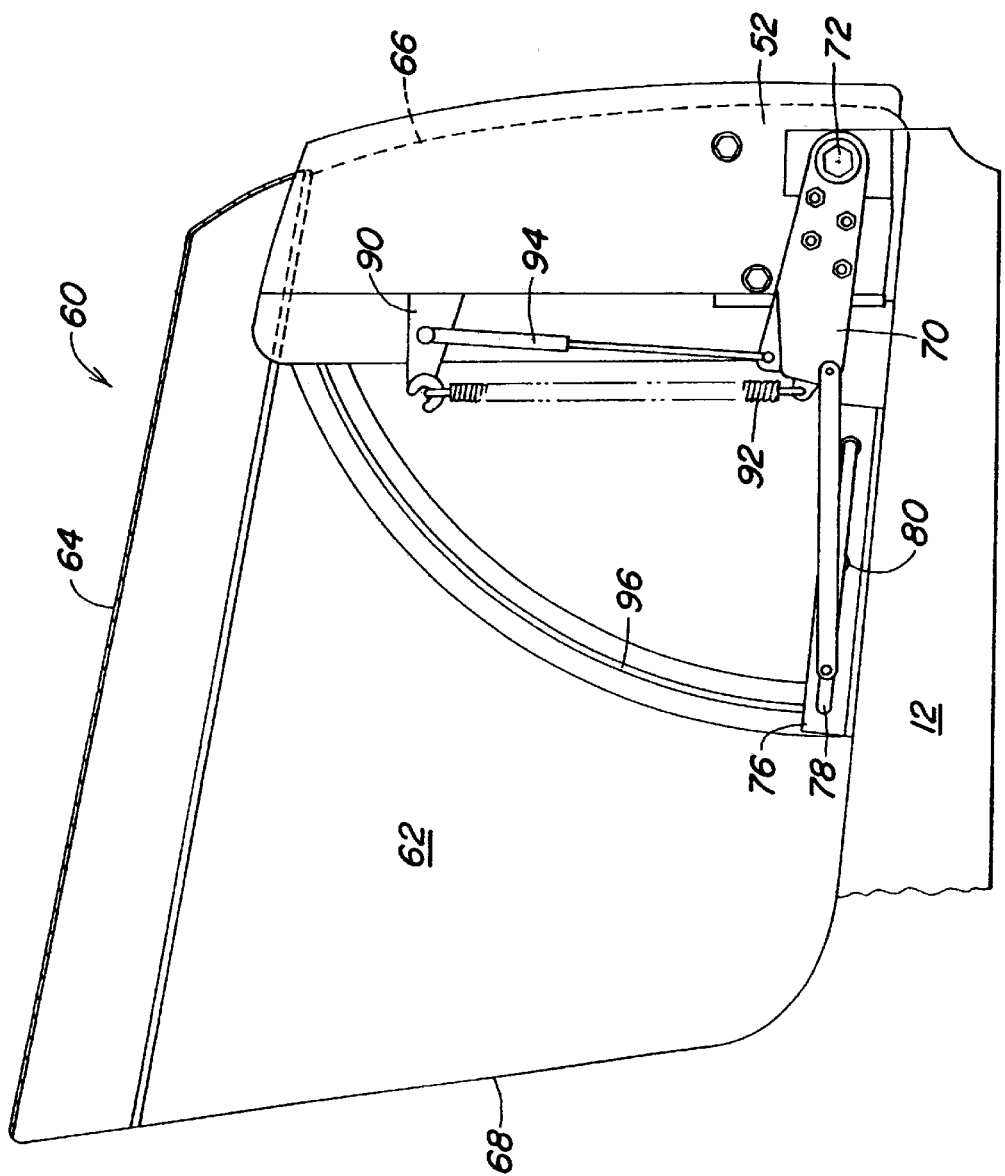
FIG. 4 is an enlarged partial cross sectional view of the hood in its closed position.
Figure 5:
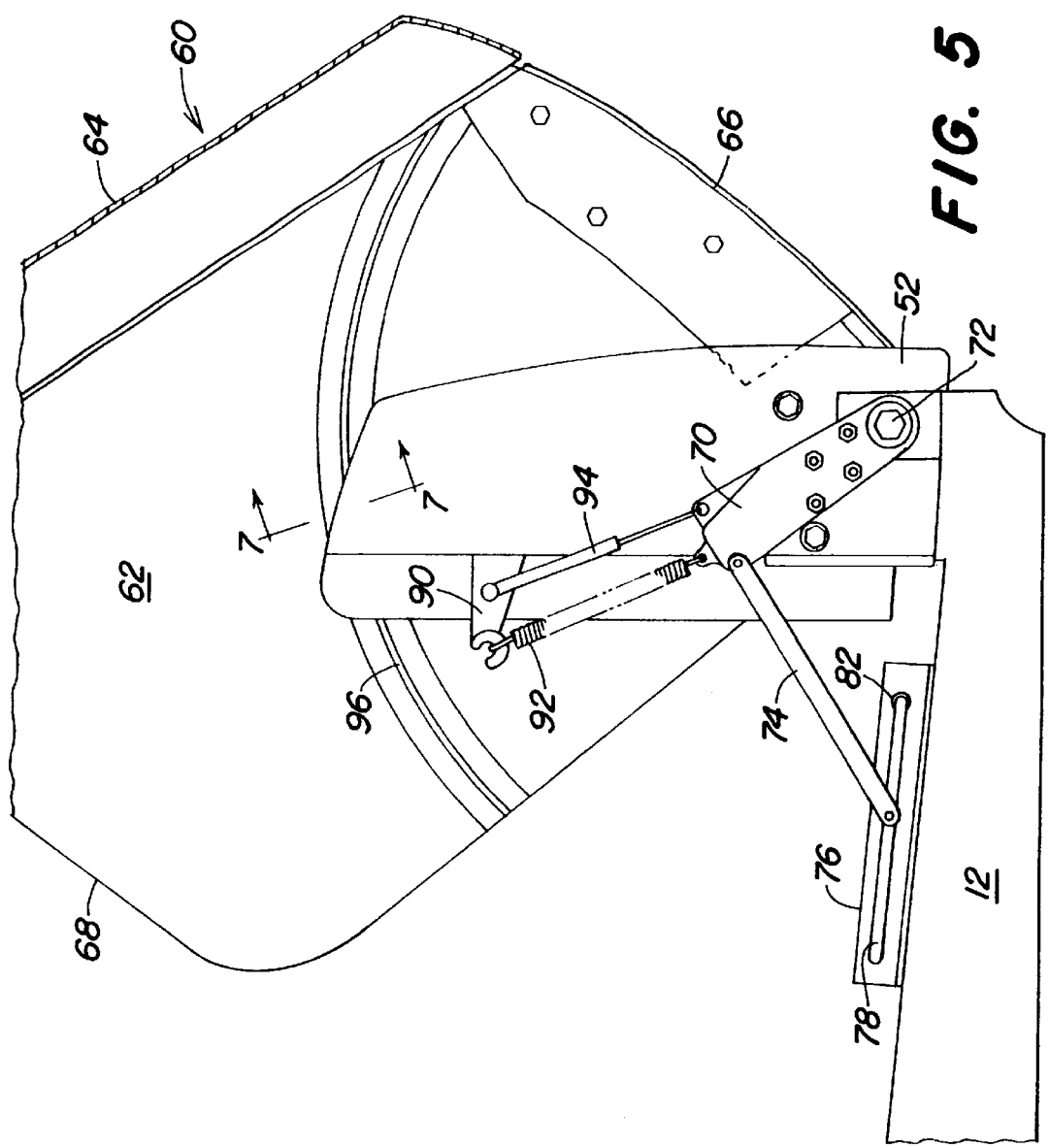
FIG. 5 is an enlarged partial cross sectional view of the hood in its intermediate opened position.
Figure 7:
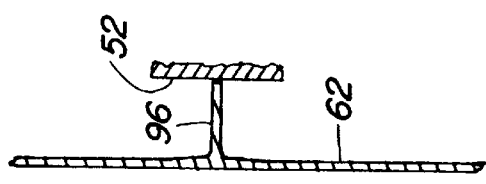
FIG. 7 is an enlarged view of the guide taken along line 7—7.
Figure 6:
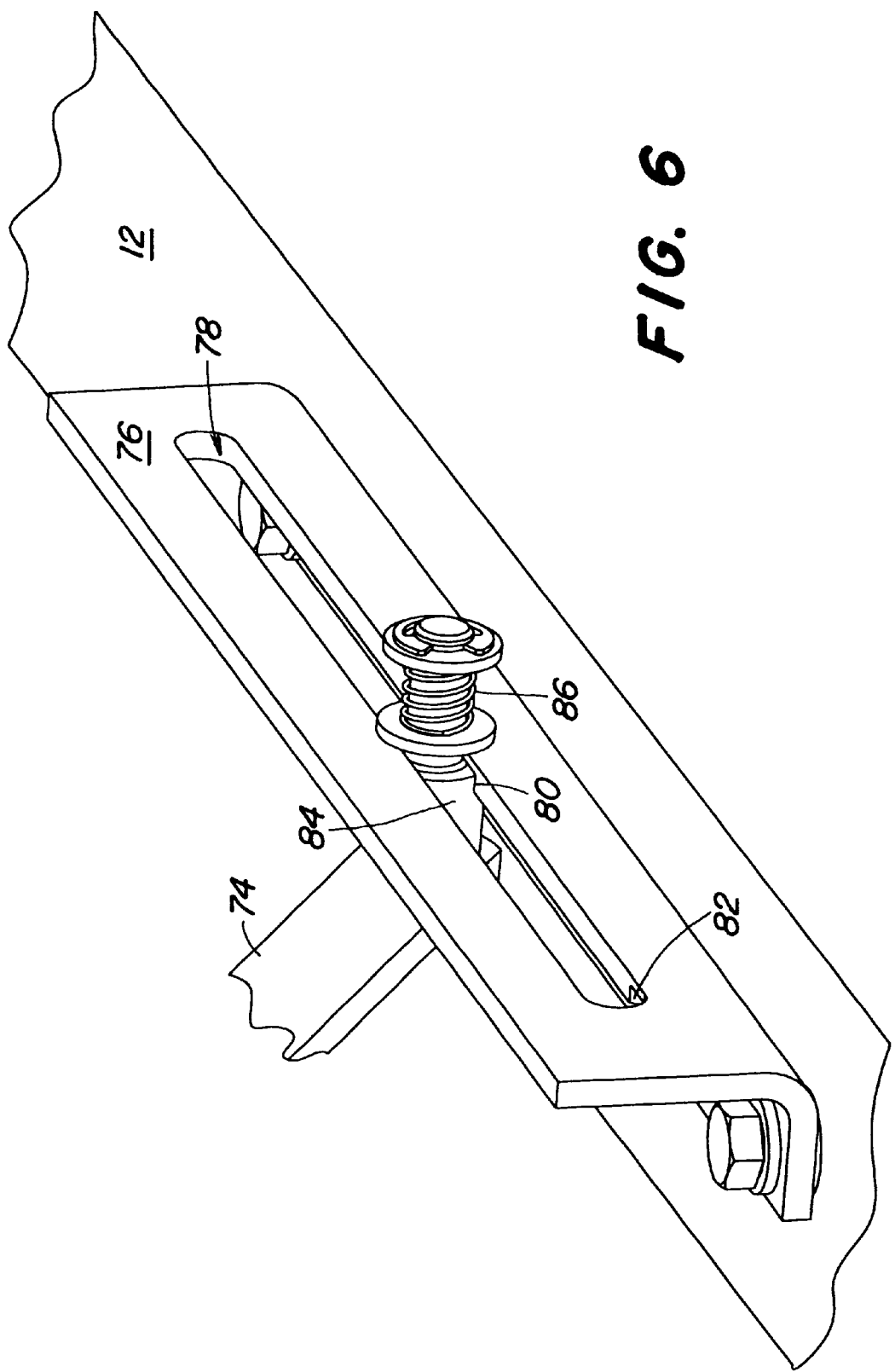
FIG. 6 is an enlarged view of the prop rod and track.

The work vehicle 10 illustrated in FIG. 1 is a backhoe loader. The work vehicle 10 is provided with a supporting structure 12 and ground engaging means 14 comprising wheels, which support and propel the supporting structure 12. Although the ground engaging means 14 of the illustrated embodiment are wheels, the present invention could also be used on tracked work vehicles having steel or rubber tracks. The supporting structure 12 is provided with a vertically extending mast 16. A first work implement 20 comprising a loader is operatively mounted to the mast 16 and the supporting structure 12. A second work implement 22 comprising a backhoe is mounted to the back 18 of the supporting structure 12. The operation of the work vehicle 10 and the operation of the first and second work implements 20 and 22 are controlled from operator's cab 24.

The loader 20 comprises lift arms 28 and a bucket 30. The lift arms 28 are pivotally mounted to the mast 16 at pivots 26. The lift arms 28 are provided with lift arm hydraulic cylinders 32 for lifting the arms 28 relative to the supporting structure 12. The lift arm hydraulic cylinders 32 are pivotally coupled to the supporting structure 12 at pivots 33. The bucket 30 is pivotally mounted to the end of the lift arms 28. Bucket 30 is provided with a bucket-tilt hydraulic cylinder 34 for tilting the bucket 30 relative to the lift arms 28.

The backhoe 22 is mounted to the back 18 of the supporting structure 12 and comprises a boom 36, a dipperstick 38 and a bucket 40. The boom 36 is pivotally coupled to a swing frame 42 about a vertical pivot and is raised and lowered relative to the swing frame 42 by a boom hydraulic cylinder 46. The dipperstick 38 is pivotally mounted to the boom about a horizontal axis and is pivoted relative to the boom 36 by dipperstick hydraulic cylinder 48. The bucket 40 is curled and uncurled relative to the dipperstick 38 by bucket hydraulic cylinder 50.

In the illustrated embodiment the swing frame 42 is pivotally coupled to the support structure 12. The swing frame 42 is pivoted relative to the supporting structure by swing frame hydraulic cylinders, not shown. The swing frame 42 could also be mounted to a side shift structure located between the swing frame 42 and the supporting structure for laterally shifting the swing frame relative to the supporting structure 12. The backhoe would normally be provided with stabilizers, not shown.

An internal combustion engine, not shown, powers the work vehicle. The internal combustion engine is mounted to the front of the supporting structure 12. The front of the supporting structure 12 is also provided with upwardly extending support flanges 52. The support flanges 52 are fixed to the supporting structure 12. The radiator and associated grill for the engine are mounted to the support flanges 52.

The internal combustion engine is housed by hood 60. The hood comprises two side walls 62 and a top wall 64 joining the side walls 62. In its closed position the hood extends longitudinally between the support flanges 52 and the mast 16, so that the front edge 66 of the hood 60 adjoins the upstanding support flanges 52 and the rear edge 68 of the hood adjoins the mast 16. The side walls 62 of the hood 60 are mounted to pivot brackets 70. The pivot brackets 70 are pivotally mounted to the front of the supporting structure 12 at pivot 72. Pivot 72 adjoins the support flanges and defines a pivot axis that passes through the support flanges 52.

A prop rod 74 is pivotally attached to one of the pivot brackets 70. In the illustrated embodiment the prop rod 74 is attached to the right pivot bracket 70. The prop rod 74 extends rearwardly from the pivot bracket 70. The end of the prop rod 74 opposite the pivot bracket is mounted to a track 76. The track 76 is mounted to the supporting structure 12 and comprises a longitudinally extending slot 78. The slot 78 is provided with a first defined position 80 and a second defined position 82. Both of these defined positions are formed by transversely extending partial bores.

The end of the prop rod opposite the pivot bracket is also provided with a catch comprising a shouldered pin 84 that is biasedly pulled by spring 86 towards the track 76. This forms an automatic catch when the hood is raised from its closed position. More specifically, as the hood 60 is raised the small diameter portion of the shouldered pin rides in the slot 78. When the shouldered pin 84 encounters the first defined position 80 the large diameter portion of the shouldered pin is biased into the partial bore. When the shouldered pin 84 enters the first partial bore the hood 60 is latched into its intermediate opened position. If the operator wants to fully open the hood 60, the operator first pulls back on the prop rod 74 disengaging the rod from the first defined position 80. Second, the operator rotates the hood 60 until it reaches its second defined position 82, where the large diameter portion of the shouldered pin 84 enters the corresponding partial bore. Thereby, latching the hood 60 in its fully opened position.

The track 76 has no defined position for the hood 60 being in its closed position. Instead the hood 60 engages the mast 16 limiting the hood's counterclockwise rotation movement. A latch structure on the mast 16 latches the hood 60 into its closed position. There is no bore for the closed position instead the slot 78 needs to be long enough to accommodate the prop rod 74 when the hood 60 is in its closed position.

The grill support flanges 52 are provided with a rearwardly extending hook 90. This hook 90 receives counterbalance spring 92 and dampener 94. The counterbalance spring 92 reduces the force necessary to pivot the hood 60 and the dampener 94 limits the speed at which the pivoting can take place.

The hood 60 can be formed from a light weight plastic material. The interior surface of both side walls 62 are provided with an integral arcuate guide 96. These guides 96 contact the side walls of the grill support flanges 52 to guide the pivotal movement of the hood 60. The arcuate guides 96 extend more inwardly at there ends than in the middle portion of the guide. In addition, to provide the guides 96 with a more substantial base, the thickness of the hood side walls 62 immediately adjacent to the guides is thicker than the other sections of the side walls. The front of each arcuate guide 96 is provided with a cylindrical nylon button, not shown, which engages the side wall of the grill support flanges 52 when the hood 60 is in its closed position. These buttons are more rugged than the arcuate guides 96 as the hood 60 is typically closed as the vehicle 10 is operated over rough terrain.

The present invention should not be limited by the above-described embodiment, but should be limited solely by the claims that follow:

We claim:

1. A work vehicle for performing a work operation, the work vehicle comprising:

a supporting structure having a front and a back;

ground engaging means for propelling the supporting structure;

a mast extending upwardly from the supporting structure, the mast is located between the front and back of the supporting structure;

a loader having lift arms, the lift arms extending forwardly from and being pivotally coupled to the mast, the lift arms having a lowered position and a raised position;

a hood extending forwardly of the mast, the hood being pivotally mounted to the front of the supporting structure on two pivots defining a transverse pivot axis, the hood having a closed position, an intermediate opened position and a fully opened position, the hood having a rear edge that adjoins the mast when the hood is in the closed position, the lift arms extending on both sides of the hood when the lift arms are in the lowered position, whereby the hood can be opened and latched in the intermediate opened position when the lift arms are in the lowered position and can be opened and latched in the fully opened position when the lift arms are in the raised position.

2. A work vehicle as defined by claim 1 wherein two support flanges are mounted to the supporting structure and extends upwardly from the front of the supporting structure, the two pivots being adjacent to the support flanges.

3. A work vehicle as defined by claim 2 wherein the transverse pivot axis passes through the support flanges.

4. A work vehicle as defined by claim 3 wherein the hood has two side walls that extend from the support flanges to the mast when the hood is in the closed position, the hood having a front edge that adjoins the support flanges when the hood is in the closed position.

5. A work vehicle as defined by claim 4 wherein each side wall of the hood is mounted to a pivot bracket, each pivot bracket being pivotally coupled to one of the two pivots.

6. A work vehicle as defined by claim 5 wherein a prop rod is pivotally coupled to the one of the pivot brackets, the prop rod extends rearwardly from the pivot bracket to a track, the track having a first defined position corresponding to the intermediate opened position of the hood and a second defined position corresponding to the fully opened position of the hood.

7. A work vehicle as defined by claim 6 wherein the prop rod engages the track with a catch that automatically engages the first defined position and the second defined position when the prop rod is moved along the track.

8. A work vehicle as defined by claim 7 wherein a counterbalance spring and a dampener extend between the pivot brackets and the support flanges.

9. A work vehicle as defined by claim 8 wherein the side walls of the hood are provided with integral guides that engage the support flanges as the hood is pivoted on the two pivots.

10. A work vehicle as defined by claim 9 wherein the track comprises a slot and the first and second defined positions comprise bores formed in the slot, the catch comprises a spring biased shouldered pin that automatically engages the bores as the catch is moved along the track.

11. A work vehicle for performing a work operation, the work vehicle comprising:

a supporting structure having a front and back, two upwardly extending support flanges are mounted to the front of the supporting structure with two pivots being adjacent to the two upwardly extending support flanges;

ground engaging means for propelling the supporting structure;

a mast extending upwardly from the supporting structure;

a work implement being operatively coupled to the mast for performing said work operation;

a hood extending forwardly of the mast and being pivotally mounted to the supporting structure, the hood being pivotally mounted to the front of the supporting structure on the two pivots defining a transverse pivot axis, the hood having a closed position, an intermediate opened position and a fully opened position, the hood having a rear edge that adjoins the mast when the hood is in the closed position, the hood having two side walls that extend from the support flanges to the mast when the hood is in the closed position, each side wall is mounted to a pivot bracket with each pivot bracket being coupled to one of the two pivots, a prop rod is pivotally coupled to one of the pivot brackets, the prop rod extends rearwardly from the pivot bracket to a track, the track having a first defined position corresponding to the intermediate opened position of the hood and a second defined position corresponding to the fully opened position of the hood, the hood having a front edge that adjoins the support flanges when the hood is in the closed position, whereby the hood can be opened and automatically latched in the intermediate opened position as the hood is rotated from its closed position and the hood can be opened and automatically latched in the fully opened position.

12. A work vehicle as defined by claim 11 wherein the prop rod engages the track with a catch that automatically engages the first defined position and the second defined position when the prop rod is moved along the track latching the hood in the corresponding position.

13. A work vehicle as defined by claim 12 wherein the track comprises a slot, and the first and second defined positions comprise bores formed in the slot, the catch comprises a spring biased shouldered pin that automatically engages the bores as the catch is moved along the track.

14. A work vehicle as defined by claim 13 wherein a counterbalance spring and a dampener extend between the pivot brackets and the support flanges.

15. A work vehicle as defined by claim 11 wherein the side walls of the hood are provided with integral guides that engage the support flanges as the hood is pivoted on the two pivots.

* * * * *